United States Patent [19]

Petersson

[11] 3,941,408

[45] Mar. 2, 1976

[54] MECHANISM FOR CONNECTING AND DISCONNECTING THE SERVICE LINES OF A TRACTOR-SEMITRAILER COMBINATION

[75] Inventor: Ralf Krister Ebbe Petersson, Alsterbro, Sweden

[73] Assignee: Kalmar Verkstads AB, Kalmar, Sweden

[22] Filed: Mar. 5, 1974

[21] Appl. No.: 448,319

[30] Foreign Application Priority Data

Mar. 6, 1973 Sweden .............................. 7303106

[52] U.S. Cl. ............................... 280/421; 280/422
[51] Int. Cl. ............................................ B60d 1/08
[58] Field of Search ........................... 280/421, 422

[56] References Cited
UNITED STATES PATENTS

| | | | |
|---|---|---|---|
| 2,043,610 | 6/1936 | Eaton ................................. | 280/421 |
| 2,924,464 | 2/1960 | Zajac .................................. | 280/422 |
| 3,181,888 | 5/1965 | Boylan et al. ....................... | 280/421 |
| 3,388,927 | 6/1968 | VonGrunberg ..................... | 280/421 |
| 3,653,686 | 4/1972 | Roesies .............................. | 280/421 |
| 3,711,122 | 1/1973 | Petersson et al. ................. | 280/421 |
| 3,734,537 | 5/1973 | Petersson et al. ................. | 280/422 X |

*Primary Examiner*—Leo Friaglia
*Attorney, Agent, or Firm*—Browne, Beveridge, Degrandi & Kline

[57] ABSTRACT

This invention relates to a mechanism for connecting and disconnecting service lines between a pair of relatively articulated vehicles, such as electrical service lines and service lines for pressurized operating fluids, between a tractor and a semitrailer, one of which having a fifth wheel and the other a king pin and each having one connector in the vicinity of the fifth wheel and the king pin, respectively, for the connection of said service lines, one of said connectors being mounted on a support which is reciprocably movable along a circular path having its center on the common geometrical axis of the fifth wheel and king pin when coupled together, whereby said one connector is free to be moved on one vehicle by the other connector which is fixed to the other vehicle in case of articulation between the tractor and the semitrailer, and one of said connectors being movable in relation to the other into and out of engagement therewith by means of an operating mechanism for the connecting and disconnecting of the service lines.

25 Claims, 10 Drawing Figures

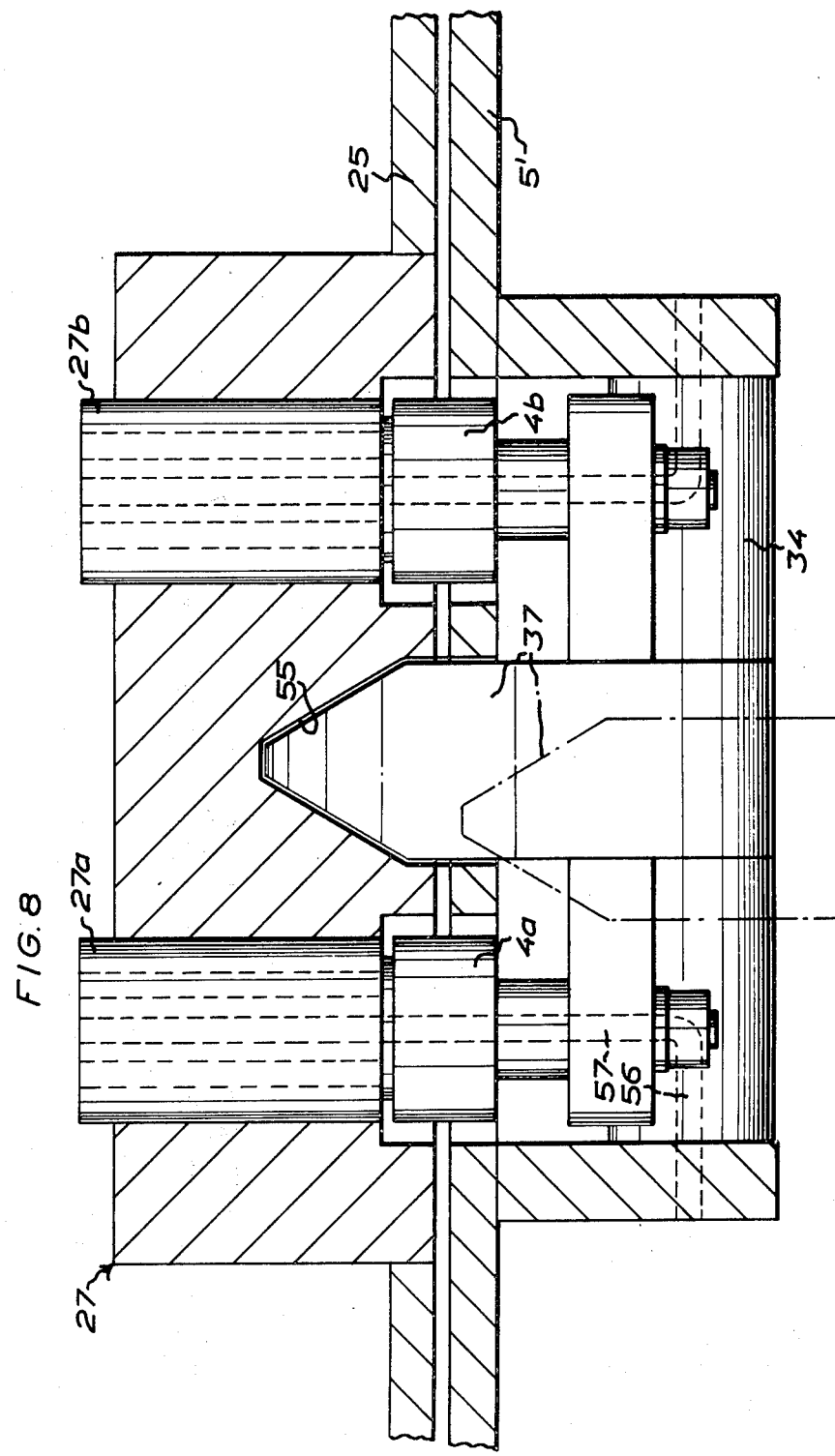

MECHANISM FOR CONNECTING AND DISCONNECTING THE SERVICE LINES OF A TRACTOR-SEMITRAILER COMBINATION

This invention relates to a mechanism for connecting and disconnecting service lines, such as electrical service lines and service lines for pressurized operating fluids, between a tractor and a semitrailer which are equipped with a fifth wheel and king pin, respectively, for mechanically coupling them together, and with at least one connector on each vehicle for the connection of the service lines.

It has already been suggested to provide the connectors for the service lines between tractors and semitrailers in the vicinity of the vehicle coupling members, i.e. the fifth wheel and the king pin, in such a way that the connectors are readily connectable after the mechanical coupling has been established. It was decided to combine the connector of the semitrailer with the king pin proper and to place the connector of the trailer at the center of the fifth wheel below the position occupied by the lower end of the king pin after being coupled with the fifth wheel so that the connectors are then readily connectable by upward movement of the connector in the fifth wheel. By the articulating movements of the vehicles during travel the connectors must be able either to effect a rotary movement relative to one another with retained connecting engagement (for instance according to U.S. Pat. No. 2,924,464), which is, however, disadvantageous in several respects, or to follow one another, which necessitates making one connector rotatable in relation to its support. The latter solution is far superior in that it permits a more reliable connection and protects the connector elements against wear (cf. U.S. Pat. No. 3,711,122).

To make said central location of the connectors possible one connector was placed in the king pin, which necessitated making the king pin hollow, while the other connector was placed in a hollow movable piston in which the connector was mounted for rotation.

However, it has proved desirable to avoid weakening the king pin by making it hollow, and still to retain the advantages of connectors one of which is rotatably supported and fixedly connected with the other connector to take part in its movements upon articulation of the vehicles. In other words, it is desirable to retain the advantages gained by the construction according to U.S. Pat. No. 3,711,122 and at the same time to use a conventional solid king pin and an optional device for locking it.

To this end, the present invention provides a mechanism for connecting the service lines of a tractor-semitrailer combination, in which at least one connector associated with the service lines of the semitrailer or the tractor and is arranged, respectively, at a distance from the king pin of the semitrailer and at a distance from the fifth wheel center for the king pin, on a support mounted on the respective vehicle unit, i.e. the semitrailer or the tractor, for movement about said king pin and said center, respectively, by means of which support the connector is reciprocably movable along a circular path about the common geometrical axis of the king pin and the center, and said connector and the mating connector of the other vehicle unit are carried in the disconnected state in such positions as to go free from one another and from the king pin upon mechanical coupling of the vehicle units and in such a manner that the two connectors, by either connector being movable in relation to the other into and out of connection therewith by means of an operating mechanism, are engageable after the mechanical coupling of the vehicle units has been completed so that the coupled vehicle units are then allowed to articulate with retained engagement between the two connectors in that one connector takes part in the movement of the other connector.

By the provision of the mechanism according to the invention the vital parts of the mechanical coupling are entirely relieved of the mechanism for the connection of the service lines, the connectors will have sufficient room and, moreover, a connection will be realized between them, which is entirely free from wear in the connected state. According to the invention, the electric and pneumatic connector elements of the connectors may be constructed in the manner disclosed by U.S. Pat. No. 3,711,122, and the connectors may be combined with a fifth wheel and king pin of conventional construction. As a consequence, it will be possible in a relatively simple manner, to equip also existing mechanical semitrailer couplings with a novel connecting mechanism.

The invention will be more fully described hereinbelow and with reference to the accompanying drawings in which:

FIGS. 1–3 diagrammatically illustrate three alternative embodiments of a connecting mechanism according to the invention combined with a fifth wheel;

Figure 6:
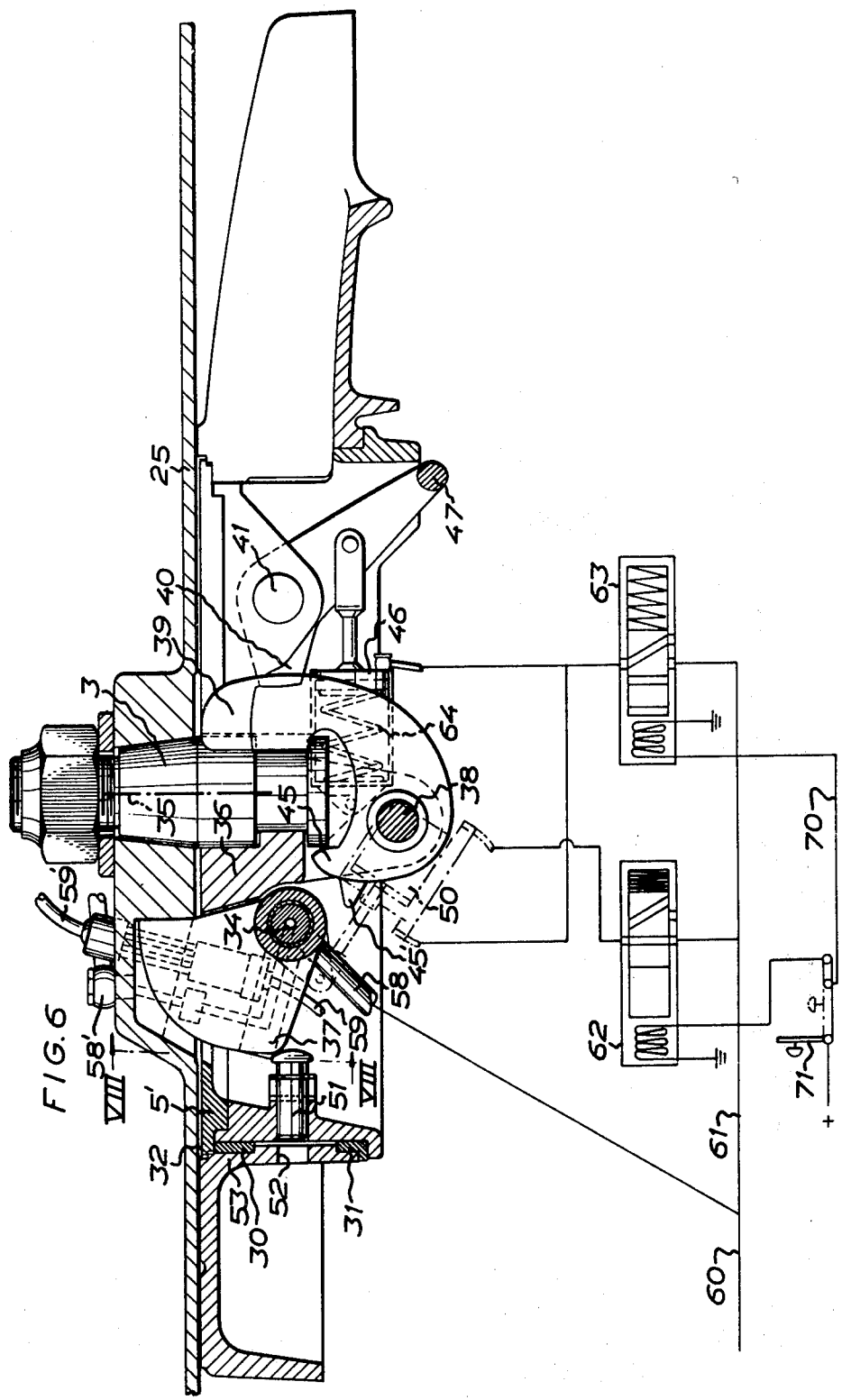
FIG. 6 is a view, similar to FIG. 5, of a modified embodiment.
Figure 7:
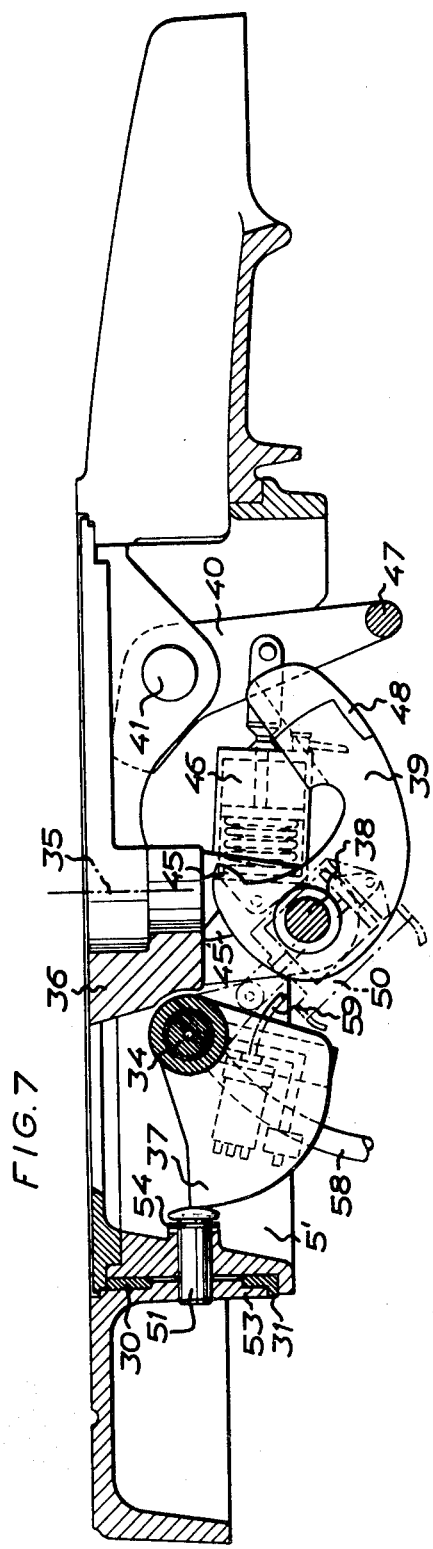
Figure 6A:
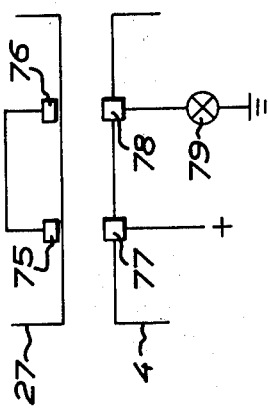

FIG. 6A diagrammatically illustrates part of a signal indicating circuit which is adapted to be closed upon connection;

FIG. 7 illustrates the fifth wheel in FIG. 6 with the coupling means in the position they occupy before coupling is established with the coupling means of the semitrailer;

FIG. 8 is a somewhat schematized cross section on the line VIII—VIII in FIG. 6 and illustrates the cam guiding the ring which is rotatably mounted in the fifth wheel and on which one connector is carried;

FIG. 9 is a detailed view of a device for retaining the ring in an approximately correct initial position prior to connection.

Figure 1:
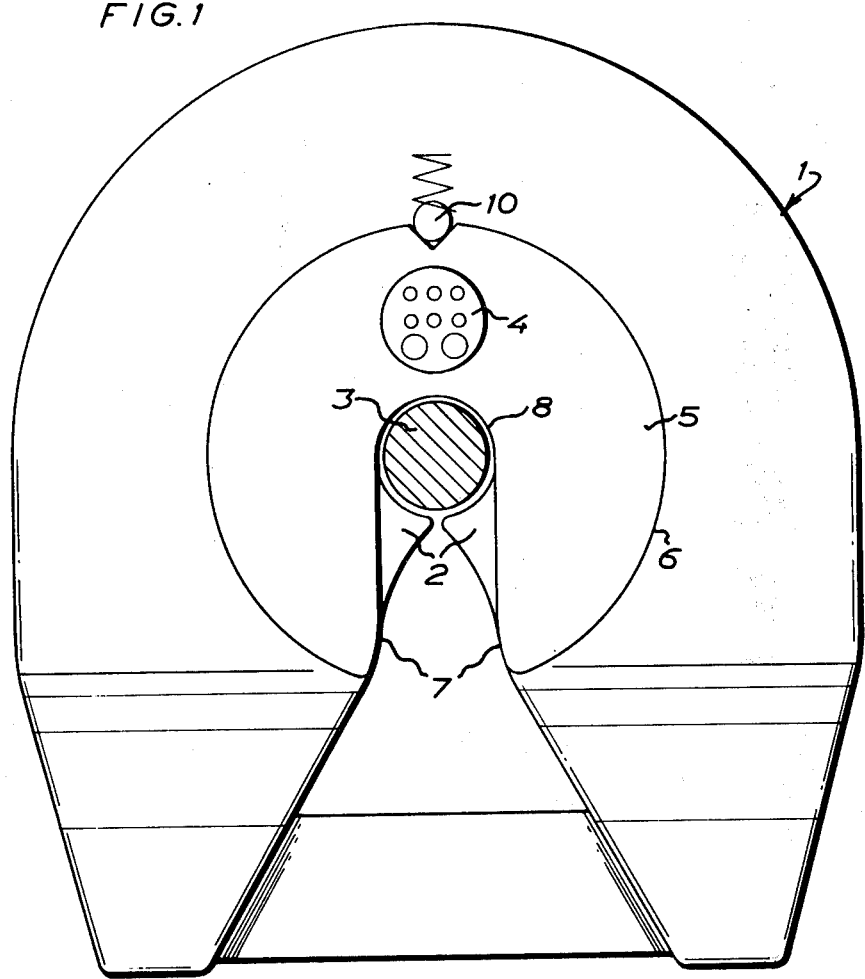

In FIG. 1, 1 designates a fifth wheel which is substantially of conventional construction and equipped with spring-loaded locking jaws 2 for retaining the king pin 3 of a semitrailer vehicle in coupled position in the fifth wheel. The relations of the fifth wheel 1 and the king pin 3 to a tractor and a semitrailer, respectively, are not shown, as they may be considered conventional.

According to the invention, a connector 4 associated with the service lines of the tractor is carried on a circular plate 5 which is mounted for rotation in guides (not shown) in the fifth wheel. The plate 5 may be located in a recess 6 of the fifth wheel on a level immediately beneath the upper side (supporting surface) of the fifth wheel and may reach in beneath the upper wall of the fifth wheel. The plate 5 is formed with a rearwardly open recess 7 corresponding to the guide opening formed in the fifth wheel for the king pin 3, said rearwardly open recess 7 terminating inwardly in a circular curved bearing surface 8 against which the king pin 3 can rest in coupled position. The locking jaws 2 can be arranged to keep the king pin 3 engaged with the surface 8 or the plate 5 can be loaded towards the king pin 3 so that the circular path of motion of the connector 4 is always centered with respect to the axis of the king pin 3.

The connector 4 in the plate 5 is arranged so as to be raisable and lowerable out of and into respectively a position of rest and a connecting position relative to the mating connector of a semitrailer by means of an operating mechanism which is not shown in FIG. 1 but can be arranged in a manner similar to the device for raising and lowering the locking pin in the connecting mechanism disclosed by U.S. Pat. No. 3,711,122 (a combination of spring and pnuematic bellows) or also for instance in the manner illustrated in FIG. 4 or FIG. 5.

The connector mounted to the semitrailer and adapted to be connected with the connectors 4 in FIG. 1, is not illustrated since it may here be sufficient to mention that it shall be fixedly mounted in a suitable height position so as to permit being moved freely inwardly over the upper plane of the fifth wheel into a position opposite the connector 4 when the king pin 3 reached its coupling position, and at a sufficiently small distance above the connector 4 in order that said connector 4 may be raised by as small a distance as possible into the contemplated engagement.

Alternatively, the connector 4 can of course be axially fixed and the connector of the semitrailer be axially displaceable downwards to establish engagement. It is also conceivable to provide the connector of the semitrailer in such a manner that it is movable along a circular path, in which case the connector 4 should be fixed in a given position.

In a modification of the FIG. 1 embodiment the connector 4 is carried on a support (not shown) which is mounted beneath the upper wall of the fifth wheel 1 and by means of which the connector is reciprocably movable in an arcuate semicircular slot (not shown), the center of the slot and that of the movement of the support lying in the hub center of the fifth wheel. In this instance, the plate 5 is thus replaced by the movable support (not shown) described for the connector 4 which in the position of rest (disconnected position) is carried with its upper end beneath the upper side of the fifth wheel 1.

As illustrated in FIG. 1 a spring-loaded centering ball or pin 10 is mounted in the fifth wheel, and in the position illustrated in FIG. 1 said ball or pin 10 engages in a recess in the plate 5 mounted for rotation in the fifth wheel and tends to retain the plate in an initial position for the connection of the connectors. Upon articulation of the tractor and the semitrailer during travel the centering element 10 is readily moved aside and does not then prevent the plate 5 from rotating. Further, the plate 5 may be spring-loaded towards the FIG. 1 position by means of one or more springs (not shown) in the fifth wheel 1.

Figure 2:
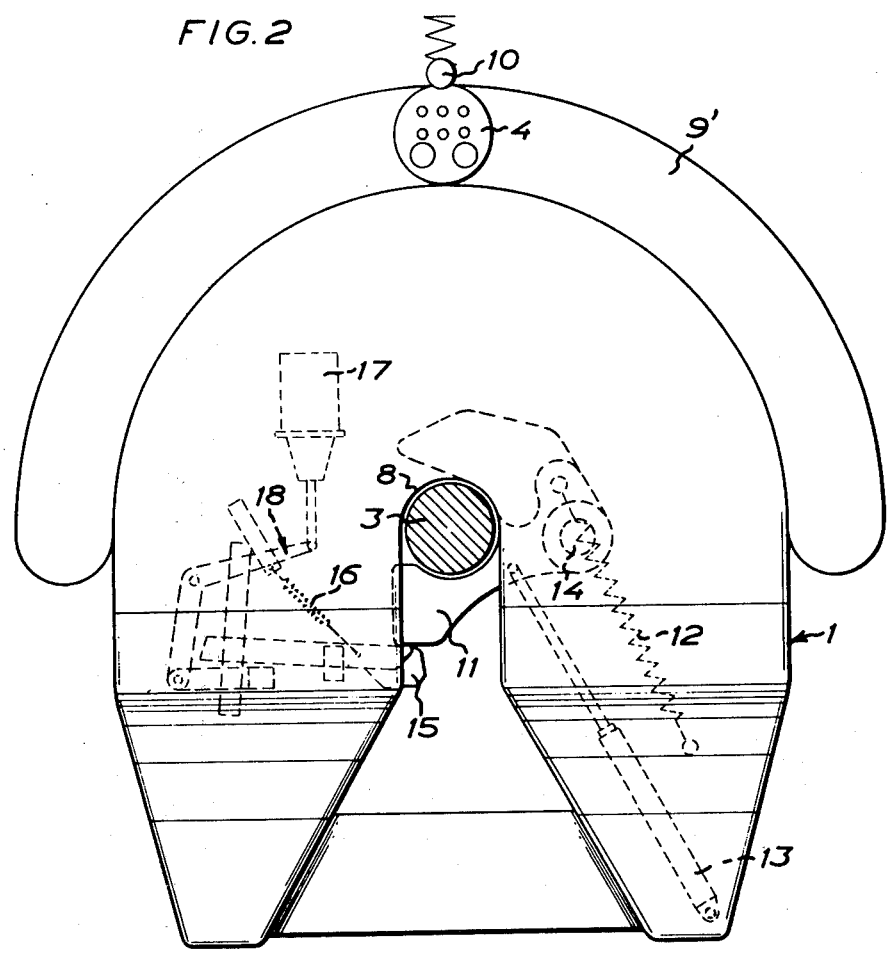

In the embodiment illustrated in FIG. 2 the connector 4 is placed on a movable support (not shown) in a circular guide 9' and is reciprocably movable on the support in a circular path of motion the center of which lies in the hub center of the fifth wheel 1, i.e. on the geometrical axis of the king pin 3 in the position said king pin occupies in its coupled state.

In the embodiment according to FIG. 2 the king pin 3 is retained in coupled position by a conventional pivotally mounted locking jaw 11 which is pivoted by means of a combination comprising a spring 12 and an operating cylinder 13 about a pin 14 to the locking position illustrated and is restored into open position (in which it is shown by dotted lines). The locking pin 11 can be locked in latched position by means of a latch 16 operable by a combination comprisng a spring 16 and an operating cylinder 17 via a linkage 18. The cylinders 13, 17 and an operating cylinder (not shown in FIG. 2) for the connector 4 can be remotely controlled from the driver's cab. The control mechanism in question may be arranged such that the movements take place in a given sequence; the connector should be operated last when a connection is established.

Figure 3:
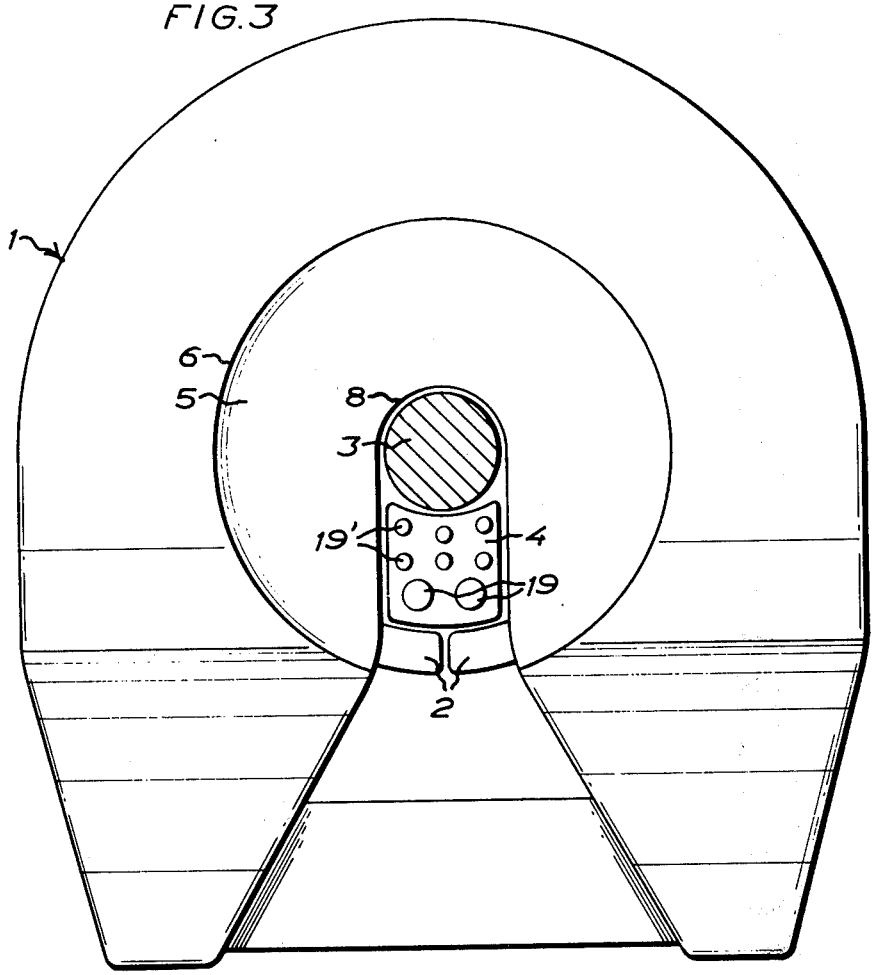

The embodiment in FIG. 3 is a variant of the main embodiment shown in FIG. 1 and differs therefrom substantially only in that the connector is disposed on the plate 5 mounted for rotation in the fifth wheel 1. In this embodiment the connector 4 shall be placed, in the position of rest, on so low a level that the king pin 3 can be freely moved over the connector 4 into coupling position, or the connector shall be so arranged, by means of an operating mechanism (not shown), that it can be swung or turned laterally from the position in FIG. 3 before the king pin 3 is introduced into the fifth wheel. This can be realized by means of a combination comprising an operating cylinder and a spring.

In FIG. 3, as in FIGS. 1 and 2, there is shown a connector comprising two air supply connecting elements 19 and six electric power supply connecting elements 19', but the number may of course be varied, as desired. The elements 19 and 19' may be constructed in the manner described in U.S. Pat. No. 3,711,122.

Figure 4:
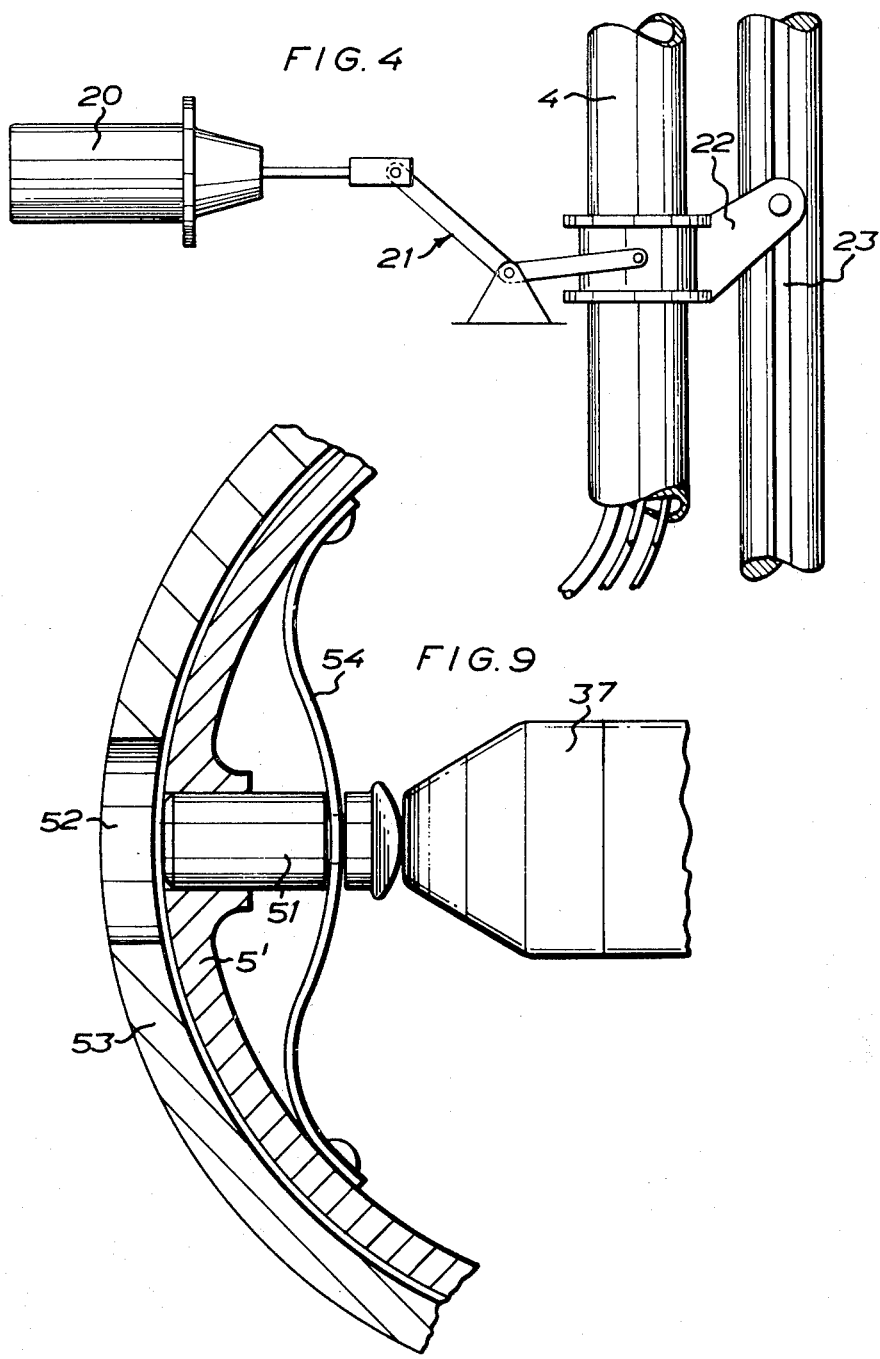
FIG. 4 is a diagrammatic view of an operating mechanism for the connector in FIG. 1, 2 or 3.

FIG. 4 shows an operating mechanism for the connector of FIGS. 1, 2 or 3 including a cylinder 20 for raising and lowering a connector 4 via a linkage 21 into and out of connecting engagement with a mating connector. In the embodiment of FIG. 4 the connector 4 is raisable and lowerable by means of a holder 22 which is movable along a guide 23. The guide 23 may be connected with the rotary plate 5 in FIG. 1.

Figure 5:
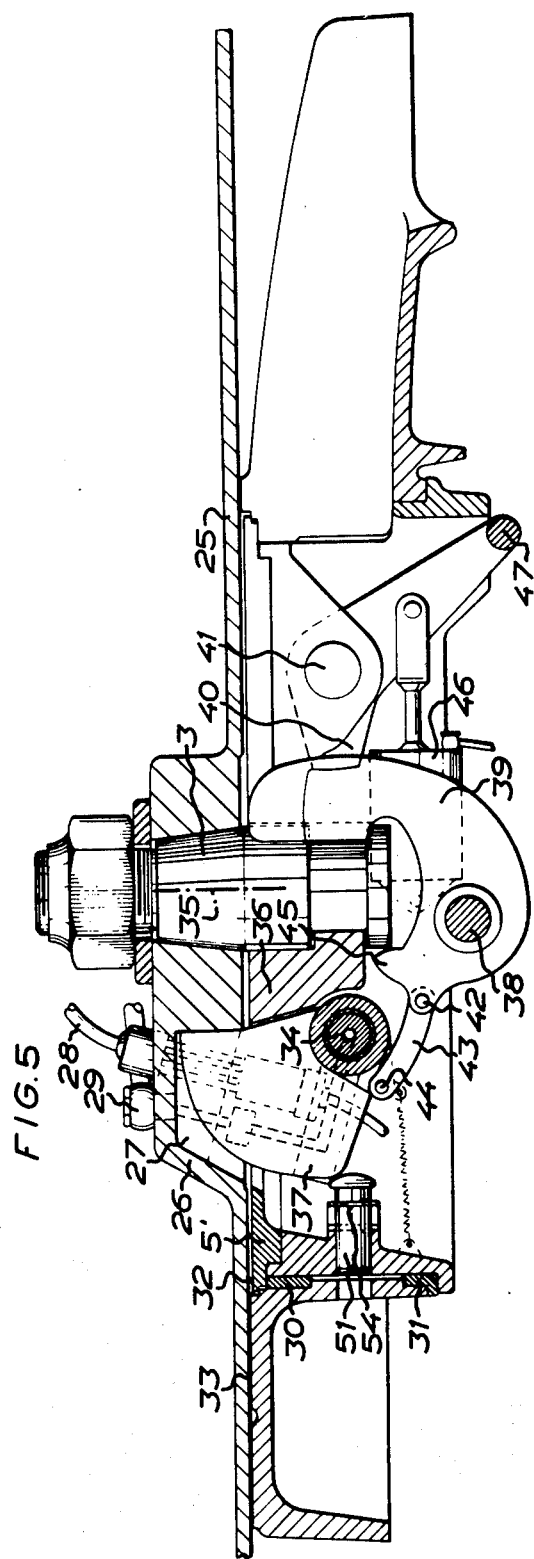
FIG. 5 is a more detailed longitudinal section of the mechanical coupling means of a tractor and a semitrailer in the coupled state, and of a service line connecting mechanism, likewise shown with the connectors in the connected state.

In the embodiment shown in FIG. 5 the fifth wheel 1 is arranged for cooperation with a solid conventional standard-type king pin 3 which is carried at the front end portion 25 of a semitrailer. A fixed connector 27 is carried in an obliquely rearwardly inclined position on an elevated portion 26 of the semitrailer in front of the king pin 3. The connector 27 includes a number of electric power supply connecting elements for an electric cable 28, and a number of pressurized air supply connecting elements for pressurized air supply lines 29. FIG. 5 shows only one half of the connector 27 and thus only one electric cable and one pressurized air supply line, but actually the connector comprises connecting elements for two electric cables and two air supply lines.

A ring 5' which fundamentally corresponds to the plate 5 in FIG. 1 but has a more pronounced ring-shape, is mounted for rotation in the fifth wheel 1 of the tractor (no part of the actual tractor is shown). The ring 5' is mounted in the fifth wheel 1 by means of a bearings 30, 31, of which the upper bearing in FIG. 5 also constitutes a supporting bearing on which the upper part of the ring 5' is carried in such a position that the upper side 32 thereof is carried below the upper side 33 of the fifth wheel 1, said latter upper side forming a supporting surface for the front end of the semitrailer. A horizontal shaft 34 is mounted in the ring 5', and the connector associated with said ring and adapted for cooperating with the mating connector 27 of the semitrailer, is carried in such a manner on said horizontal shaft 34 that it can be swung from a lower position of rest (see FIG. 8) to an upper connecting position in which the connector is positioned as illustrated in FIG. 5.

In the embodiment shown in FIG. 5 the connector 27 and the connector 4 each comprise two halves symmetrically placed on opposite sides of a central longitudinal vertical plane extending through the hub center 35 of the fifth wheel 1, which center is adapted to receive the coupling pin 3. The hub 36 of the fifth wheel is carried by the ring 5'. The two halves of the connector 4 (only one half is shown in FIG. 5) are mounted on opposite sides of a cam 37 which is mounted for rotation on the shaft 34. The function of said cam 37 which may constitute a support for the connector 4 with respect to the shaft 34, shall be described more in detail hereinbelow and with reference to FIG. 8.

In the embodiment shown in FIG. 5 a locking jaw 39 is mounted on a horizontal shaft 38 connected to the fifth wheel 1 beneath the hub 36. Said locking jaw 39 can be swung on said shaft 38 and is adapted to keep the king pin 3 in coupling engagement with the fifth wheel 1 in cooperation with a latch 40 which is mounted swingable on a shaft 41 coupled to the fifth wheel. The locking jaw 39 is pivotally connected at 42 with a link 43 which in turn is pivotally connected at 44 with the cam 37. At said linkage the cam 37 can be operated by means of the locking jaw 39. The locking jaw 39 has a projection 45 which in the coupled position of the king pin 3 rests on the front edge of the lower end flange of the king pin 3 when the locking jaw 39 is raised from a lower position of rest (cf. FIG. 7) to an upper locking position in which it is applied against the rear of the king pin 3. In the position of rest of the locking jaw the king pin 3 can be freely inserted through the rear opening of the fifth wheel 1 and the ring 5' to the coupling position illustrated in FIG. 5. In this free position of the locking jaw 39, however, the projection 45 lies in the path of motion of the lower end of the king pin 3 so that when inserted to coupling position the king pin 3 by striking the projection 45 automatically swings the jaw 39 to the locking or latching position illustrated in FIG. 5, whereby the jaw 39 swings the cam 37 and the connector 4 via the link 43 to the coupling position illustrated in FIG. 5 (cf. also FIG. 7).

The latch 40 is in the form of a two-armed lever pivoted to the shaft 41. After the locking jaw 39 has been swung upwards into locking position, the lever can be swung counter-clockwise from a position of rest (cf. FIG. 7) to a latching position in application against the rear of the jaw 39. The latch 40 can be pivoted into and out of latching position by means of a combination comprising an operating cylinder 46 and a spring means which may be built into the cylinder 46 (cf. the embodiment shown in FIG. 6).

In the embodiment of FIG. 5 and the embodiment of FIG. 6 use is made of two identical latches 40 which are interconnected by means of a rod 47 and in latching position engage seats 48 (cf. FIG. 7) on either side of the jaw 39. The upper end portion of the jaw 39 is of such a configuration that the two latches 40 can be freely pivoted counter-clockwise towards the jaw until they enter the seats 48 of said jaw 39. Pivotment of the latches 40 to latching position preferably takes place by means of the described spring load, whereas pivotment into free position takes place by means of the operating cylinder 46. The latches 40 can thus be automatically moved into and out of latching position by venting of the operating cylinder 46 and supplying it with air, respectively.

To permit swinging the connector 4 (and the cam 37) up and down independently of the locking jaw 39, the link 43 can be rendered selectively ineffective by providing it with a link drive or slot permitting the pivot 44 to move longitudinally of the link. In that case a separate operating cylinder mounted in parallel with the cylinder 46 can be utilized to operate the cam 37 and the connector 4. The mechanical coupling in FIG. 5 and the locking device 39, 40 for the king pin can then be used for a semitrailer which is not equipped with a connector 27 of the type illustrated in FIG. 5, but has conventional means for electric power and pressurized air supply. The connector 4 in the fifth wheel can be retained in lowered position, and a separate connector disposed on the tractor can be used to establish connection with the electric power and pressurized air supply lines of the semitrailer.

It should be observed that the construction of the means 40 for latching the locking jaw 39 can be combined with the arrangement of the connector 4 illustrated in FIG. 3. As a matter of fact, the connector shown in FIG. 3 can be placed in such a position on the latch 40 that upon pivotment of the latch to latching position said connector is swung upwardly into a connecting position relative to a connector which is mounted on the semitrailer rearwardly of the king pin 3 and is of the same kind as the connector 27, it being possible optionally to select an inclined or vertical position for the connector disposed on the semitrailer. In that case, like in other cases, use may be made of connectors one of which is mainly of V-shaped with the ends of the connecting elements situated on the inner side of the V while the other connector is of wedge shape with the ends of the connecting elements situated on the wedge sides.

The embodiment illustrated in FIGS. 6 and 7 differs from that of FIG. 5 mainly in that the link 43 shown in FIG. 5 has been dispensed with and that instead of said link use is made of a separate operating cylinder 50 for upward and downward swinging of the cam 37 and thus of the connector 4. FIG. 7 also shows a device for keeping the ring 5' in such an initial position that the rear opening of the ring 5' allows insertion of the king pin 3 to the coupling position in the hub 36.

Said device (cf. also FIG. 9) comprises a piston 51 mounted in a hole formed in the ring 5' and a hole 52 formed in an annular flange 53 directed vertically downward from the upper wall of the fifth wheel, the ring 5' being mounted in said flange by means of the bearings 30, 31. The piston 51 is mounted in the ring 5' diametrically to the opening of the ring provided for the king pin 3, and the hole 52 is situated in a corresponding position in the flange 53. The hole 52, however, is in the form of an elongated hole the longitudinal axis of which extends in the circumferential direction of the flange 53 in order to provide a certain adjustability of the ring 5' for setting the rear opening thereof into correct position, should the mechanical coupling of the semitrailer and the tractor take place at a certain angle of articulation between said vehicles. Mounted on the inner side of the ring 5' is leaf spring 54 which is connected with the piston 51 and tends to retract the piston 51 to an inoperative position in said ring 5'. From said inoperative position (in which the ring 5' is freely rotatable) the piston 51 can be pushed into the hole 52 of the flange 53 by means of the cam 37 the front end of which always occupies a position opposite the rear end of the piston 51. Said front edge is of such a curved shape that the piston 51 can be kept by means of the spring 54 in retracted position in said ring 5' when coupling has been established and the cam is swung upwards (position in FIG. 6) and so that the cam when returned to its lower position of rest urges the piston 51 in a forward direction by means of its front edge to introduce the piston into the hole 52. It will be understood from this that the connector 4 and the cam 37 cannot be restored to their positions of rest until the ring 5' has been set into such a position that the king pin 3 can be moved out of the ring 5' and the fifth wheel 1 upon uncoupling, and that the ring 5' is then kept adjusted in an initial position in which a mechanical coupling operation can be realized.

A correct initial position of the ring 5' for the mechanical coupling operation does not guarantee that the connector 4 as a result is in correct initial position for being connected with the connector 27 disposed on the semitrailer. However, the ring 5' can be turned to the correct position by means of the cam 37 the outer edge of which is of the wedge shape illustrated in FIG. 8 to cooperate with a conforming longitudinal groove 55 at the underside of the semitrailer in front of the king pin 3. When the cam is pivoted in an upward direction the upper corner of the cam first reaches and enters the relatively wide mouth of the groove 55. The vertical middle plane of the groove 55 and the cam 37 may make an angle with each other at the beginning of a coupling operation, which angle does not exceed the maximum permissible angle of articulation between the tractor and the semitrailer for realizing a mechanical coupling. The mouth of the groove 55 is dimensioned accordingly so that the outer edge of the cam 37 can be introduced with certainty into the groove mouth. When the cam 37 is then swung in an upward direction the ring 5' is turned into the correct position by power exerted between the cam and the boundary surfaces of the groove. To turn the ring 5' into the correct position by means of the cam it is only necessary to exert a sufficient force to overcome the inertia and friction of the ring 5', since the ring 5' is not subjected to any vertical load from the semitrailer.

As illustrated in FIG. 8 axial and radial channels 56, 57 are formed in the shaft 34 to which the cam 37 and the two halves 4a, 4b of the connector 4 are mounted. Said channels join the pressurized fluid lines of the tractor to connecting elements for said lines in the connector 4. By coupling the pressurized fluid lines with said channels by so-called swivel couplings, that is rotary tight couplings, it is possible to prevent the pressurized fluid lines from bending at the upward and downward pivotment of the connector 4.

FIG. 6 illustrates a pressurized air supply line 58 joined to the connector 4 and connected to a source of pressurized air (not shown) in the tractor, and a corresponding line 58' (joined to the connector 27) in the semitrailer. The electric power supply lines are shown at 59 and 59', respectively.

A control system of the type illustrated in FIG. 6 can be used for the actuation of the two cylinders in the embodiment shown in FIGS. 6 and 7. The source of pressurized air of the tractor is joined to the incoming pressurized air line 58 in the connector 4 via a pressurized air supply line 60 which is connected to a control circuit 61 including two electromagnetically actuated air valves 62, 63. The outlets of the two valves 62, 63 are each connected to one side of the operating cylinder 50 for the connector 4. One valve 63 besides is connected to one side of the operating cylinder 46 for the latch 40. The last-mentioned valve 63 permits simultaneous venting of the two cylinders 46, 50 and the pistons in the cylinders can be moved, also simultaneously, inwardly in the respectively cylinder, one cylinder 46 pivoting the latch 40 to the position in which it releases the locking jaw 34, while the other cylinder 50 pivots the connector 4 downwardly into position of rest. The first cylinder 46 has a return spring 64 while the second is a double-acting cylinder. When both cylinders 46, 50 are supplied by means of the right valve the latch 40 is first released and then the locking jaw 39 (the piston in the cylinder 46 is operated simultaneously with the piston in the cylinder 50 which pivots the cam 27 downwards). Upon release of the latch 40 the spring 64 is tensioned, whereupon the latch can be returned to latching position by venting of the cylinder 46. Upon upward swinging of the connector 4 the locking jaw 39 is pushed in clockwise direction, whereupon said locking jaw by its own weight can fall rearwardly and downwardly to the releasing position illustrated in FIG. 7, in which the projection 45 of the jaw 39 lies in the path of motion of the king pin 3 when the latter is entered for coupling purposes. Another projection 45' of the jaw 39 rests on the lower end of the hub 36.

FIG. 6 also shows, in a simplified diagram, an electric control circuit 70 including a switch 71 for the actuation of the two valves. The switch 71 is shown by full lines in an open position (deenergizing position for the solenoids of the two valves 62, 63). In the closed position of the switch 71 (shown by dash-and-dot lines) the solenoids are energized. In the open position of the switch the valves are set into the positions in which they are shown in FIG. 6. The right cylinder 46 is then vented by means of the right valve 63 and the left cylinder 50 is connected to the pressurized air supply line 60 by means of the left valve 62. Upon closure of the switch 71 the valves are reset so that the two cylinders are supplied simultaneously on the piston rod side via the right valve 63, while the left cylinder 50 is vented via the left valve 62. The locking jaw 39 and the latch 40 are thereby transferred to the positions in FIG. 7.

FIG. 6A finally shows a signal indicating circuit comprised in the electric power supply line between the tractor and the semitrailer and including two short-circuited contact plugs 75, 76 in the connector 27 of the semitrailer and two corresponding contact plugs 77, 78 in the connector 4 of the fifth wheel. When the connectors 4, 27 are interconnected, a signal lamp 79 is lighted, which also indicates that the mechanical coupling has ben correctly effected.

The embodiments illustrated in FIGS. 5-9 are preferred because it is simpler, for several reasons, to mount the rotatable ring 5' in the fifth wheel than on the semitrailer inter alia since tractors usually are equipped with a power source which can be exploited for the operating cylinders), but it is technically feasible to employ the reverse arrangement, and therefore the invention is not restricted to the embodiments described and illustrated, but should be interpreted as embracing any conceivable variations and modifications that fall within the spirit and scope of the appended claims.

What I claim and desire to secure by Letters Patent is:

1. A mechanism for connecting and disconnecting service lines, such as electrical service lines and service lines for pressurized operating fluids, between a tractor and a semi-trailer having a fifth wheel and king pin, respectively, comprising at least one connector associated with the service lines of the semi-trailer at a distance from the king pin center and at least one connector associated with the service lines of the tractor at the same distance from the fifth wheel center for the king pin, each of said connectors mounted on the respective vehicle units with one of said connectors mounted for movement about the respective center whereby the connector is reciprocably movable along a circular path about the common geometrical axis of the aligned king pin and fifth wheel centers, operating means on one of said vehicle units for moving a respective one of said connectors relative to the other to connect said connectors together whereby after mechanical coupling of the vehicle units said units may articulate with retained engagement between the two connectors.

2. A mechanism as claimed in claim 1 in which the two connectors are intended for interconnection by relative displacement towards one another along an at least substantially vertical axis, wherein the connector disposed on the semitrailer is carried in a substantially fixed height position while the connector disposed on the tractor is carried raisable and lowerable by means of said operating mechanism for displacement out of and into a lower position in which it is moved out of the way, and an upper connecting position.

3. A mechanism as claimed in claim 1, wherein the connector disposed on the tractor is movably guided in a vertical guide associated with the tractor, and the operating mechanism comprises a servo-motor connected with said connector and adapted to be driven by a power source in the tractor.

4. A mechanism as claimed in claim 1, wherein latch means are adapted to be brought into an engagement, which is elastically yieldable or releasable by positively moving the latch means out of the way, with that connector which is reciprocably movable in a circular path, in order to keep said connector in an initial position for realizing interconnection with the other connector which is carried preferably in a fixed angular position in relation to the corresponding vehicle and which can be moved out of the way to allow said first mentioned connector to move in the circular path after connection has been established.

5. A mechanism as claimed in claim 4, wherein two centering means are provided, one of which is movably carried together with the connector disposed on one vehicle unit and reciprocably movable in a circular path, while the other centering means is carried by the other vehicle unit, and said centering means are adapted at a connecting operation to be engaged and to thereby automatically set the movable connector into a position permitting its interconnection with the other connector.

6. A mechanism as claimed in claim 5, wherein one centering means is a part rotatable about a shaft and the other centering means is a guide having guide surfaces for guiding the first mentioned part to a given position in relation to the guide upon rotation of said part towards and into engagement with the guide.

7. A mechanism as claimed in claim 6, wherein one centering means is adapted to cooperate with the latch means and automatically to return that connector which is reciprocably movable in a circular path, to centered position after release, and the circular path of motion of the connector is limited to an angle less than 180° on either side of the centering position.

8. A mechanism as claimed in claim 1, wherein said connector which is reciprocably movable in a circular path is mounted on a support, said support being mounted on a guide connected to the fifth wheel.

9. A mechanism as claimed in claim 1, wherein one of said connectors is movably mounted on the tractor by a plate supported by said fifth wheel and having such a configuration that it permits unrestricted introduction of the king pin to the coupling position in the fifth wheel at least in the centered position of the connector carried by said support.

10. A mechanism as claimed in claim 1, wherein either of the two connectors in fixed position and centered position, respectively, for interconnection with the other connector is situated in the rearwardly open recess in the fifth wheel which leads to the central cavity formed in the fifth wheel for receiving the king pin.

11. A mechanism as claimed in claim 1, wherein either of the two connectors in fixed position and centered position, respectively, for interconnection with the other connector is situated in front of the central cavity formed in the fifth wheel for receiving the king pin.

12. A mechanism as claimed in claim 1, wherein either of the two connectors in fixed position and centered position, respectively, for interconnection with the other connector is situated in front of the fifth wheel.

13. A mechanism as claimed in claim 1, wherein the connector reciprocably movable in a circular path is carried by a support in a position in front of the fifth wheel, and the support is guided in relation to the center of the fifth wheel by a guide including a circular edge surface on the fifth wheel, or in a circular guide associated with the fifth wheel.

14. A mechanism as claimed in claim 1, wherein either of the two connectors has substantially V-shape and the other connector wedge shape, the connecting elements being placed in the angle of the V and on the diverging sides of the wedge, respectively, and the wedge-shaped connector is adapted to be introduced into the V-shaped connector by a movement which at least in the final phase takes place in the wedge direction.

15. A mechanism as claimed in claim 1, in which the mechanical coupling mechanism associated with the fifth wheel includes a movable device for locking the king pin in the coupling position, wherein the locking means and the movable connector which is mounted on the fifth wheel and preferably is that connector which is reciprocably movable along said circular path, are operable by one and the same operating means by which the locking of the king pin and the interconnection of the connectors are realized simultaneously.

16. A mechanism as claimed in claim 1 wherein said connector which is reciprocably movable in a circular path is mounted on a support in the fifth wheel; said connector is pivoted to a shaft connected with the support for swinging movement from a lowered position in which the upper end of the connector lies on a level beneath the upper side of the fifth wheel, to a raised position; and the connector disposed on the semitrailer is fixed in a position in which its outer downwardly facing end lies in a suitable position for engagement with the connector disposed on the fifth wheel when said lastmentioned connector is raised.

17. A mechanism as claimed in claim 16, wherein the connector disposed on the fifth wheel is connected by a linkage to a locking jaw pivotally mounted in the fifth wheel for locking the king pin in coupled position, and the locking jaws or the linkage includes an abutment which is adapted to cooperate with the king pin and to this end is situated, in the released position, in the path of motion of the king pin when the latter is introduced into coupling position, and is adapted, when struck by the king pin, to be actuated by said king pin and thereby to swing the locking jaw into locking position behind the king pin.

18. A mechanism as claimed in claim 17, wherein the locking jaw is adapted, at its swinging movement into locking position, to raise the connector into connecting position.

19. A mechanism as claimed in claim 18, wherein a latch is provided for retaining the locking jaw, said latch being pivotally mounted to a shaft in the fifth wheel and swung from an inoperative position to a latching position in engagement with the locking jaw, in which the latch via the locking jaw prevents the interconnected connectors from being moved apart.

20. A mechanism as claimed in claim 19, wherein the locking jaw is adapted, after the latch has been moved aside, to permit movement of the king pin out of the fifth wheel by swinging back to the position of rest and thereby to return the pivotally mounted connector into position of rest.

21. A mechanism as claimed in claim 20, wherein a spring load and an operating cylinder are associated with a latch which is adapted to be swung into position of rest by said cylinder against the action of the spring load which tends to swing the latch into latching position.

22. A mechanism as claimed in claim 1, wherein said connector which is reciprocably movable in a circular path is mounted on a support, said support being a ring mounted for rotation in the fifth wheel on a level beneath that surface of the fifth wheel which is to support a semitrailer, the wall of said ring having, at a point corresponding to the opening of the fifth wheel for the king pin of the semitrailer, an opening or recess for allowing the king pin to enter the cavity of the fifth wheel, and in the vicinity of said opening or recess, said ring carries the bearing or hub of the fifth wheel for receiving the king pin and further carries the connector in front of said bearing or hub.

23. A mechanism as claimed in claim 22, wherein the connector is pivotally supported on a horizontal shaft in said ring, and said shaft is formed with channels for the connection of a pressurized fluid line in the tractor with the connector disposed thereon.

24. A mechanism as claimed in claim 23, wherein the centering means includes a cam which is mounted on said shaft and connected with the connector disposed on the tractor and which is rotatable in a vertical plane and adapted, upon pivotment of said connector into connecting position with respect to the connector disposed on the semitrailer, to be moved into a groove in the semitrailer for rotation of the ring into the correct position with respect to the connector disposed on the semitrailer.

25. A mechanism as claimed in claim 24, wherein said cam is rotatable by an operating cylinder.

* * * * *